(12) United States Patent
Meintschel et al.

(10) Patent No.: US 8,474,422 B2
(45) Date of Patent: Jul. 2, 2013

(54) CAMSHAFT UNIT

(75) Inventors: Jens Meintschel, Bernsdorf (DE);
Thomas Stolk, Kirchheim (DE);
Alexander von Gaisberg-Helfenberg,
Beilstein (DE); Richard Jakobi,
Winnenden (DE)

(73) Assignee: Daimler AG, Stuttgart (DE)

( * ) Notice: Subject to any disclaimer, the term of this patent is extended or adjusted under 35 U.S.C. 154(b) by 344 days.

(21) Appl. No.: 12/927,118

(22) Filed: Nov. 5, 2010

(65) Prior Publication Data
US 2011/0079190 A1 Apr. 7, 2011

Related U.S. Application Data

(63) Continuation-in-part of application No. PCT/EP2009/004384, filed on Jun. 18, 2009.

(30) Foreign Application Priority Data

Jul. 3, 2008 (DE) .......................... 10 2008 031 505

(51) Int. Cl.
*F01L 1/34* (2006.01)
(52) U.S. Cl.
USPC ................... 123/90.17; 123/90.15; 123/90.31

(58) Field of Classification Search
USPC ................... 123/90.15, 90.17, 90.31
See application file for complete search history.

(56) References Cited

U.S. PATENT DOCUMENTS

| | | | |
|---|---|---|---|
| 5,381,764 A * | 1/1995 | Fukuma et al. | ............ 123/90.17 |
| 6,129,061 A | 10/2000 | Okuda et al. | |
| 6,502,537 B2 | 1/2003 | Todo et al. | |

FOREIGN PATENT DOCUMENTS

| | | |
|---|---|---|
| DE | 10 2004 014 865 | 10/2005 |
| DE | 10 2004 027 514 | 12/2005 |
| EP | 0 918 142 | 5/1999 |
| JP | 10 121919 | 5/1998 |
| JP | 2005 264898 | 9/2005 |

* cited by examiner

*Primary Examiner* — Zelalem Eshete
(74) *Attorney, Agent, or Firm* — Klaus J. Bach

(57) ABSTRACT

In a camshaft unit, particularly of an internal combustion engine, comprising a camshaft connected to a drive unit to be driven thereby, a phase displacement unit including an actuating gear and a control unit with a rotor and a stator unit in the form of a brake element for adjusting a phase relation between the drive unit and the camshaft, and a bearing device for supporting part of the control unit, the bearing device is designed to accommodate radial tolerances between the stator element and the rotor element.

12 Claims, 1 Drawing Sheet

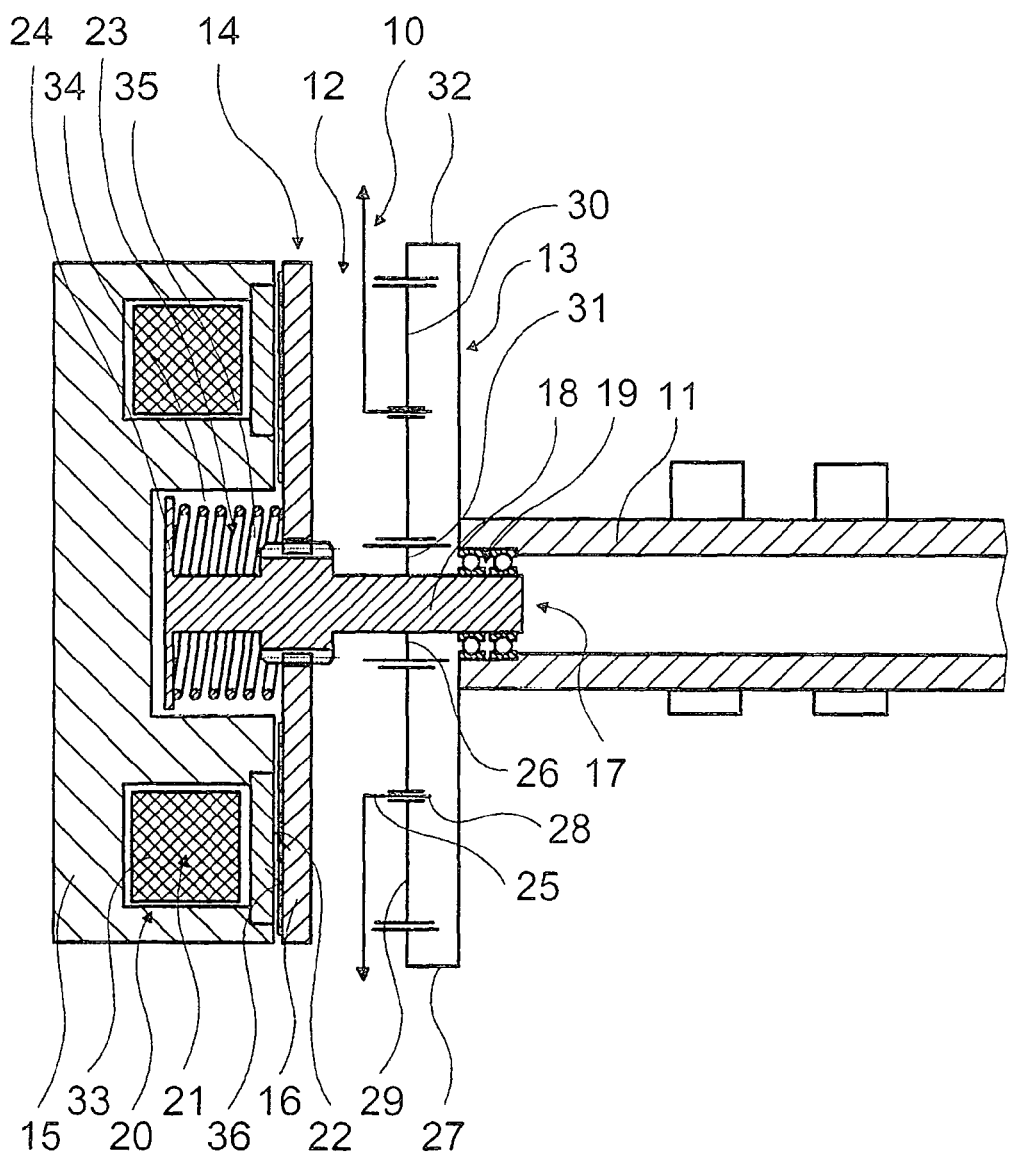

CAMSHAFT UNIT

This is a Continuation-In-Part Application of international patent application PCT/EP2009/004384 filed Jun. 18, 2009 and claiming the priority of German patent application 10 2008 031 505.2 filed Jul. 3, 2008.

BACKGROUND OF THE INVENTION

The invention relates to a camshaft unit with a camshaft driven by a drive unit and including a phase displacement unit and a control unit for adjusting a phase relation between the drive unit and the camshaft.

Camshaft units, in particular of an internal combustion engine, with a camshaft that can be driven via a drive shaft are already known. The camshaft unit comprises a phase displacement unit which has an actuating gear and a control unit with a stator element designed as a brake unit and a rotor element designed as a brake element. The phase displacement unit is provided to adjust a phase relation between the drive unit and the camshaft. The camshaft unit further comprises a bearing device which is provided to mount at least a part of the control unit designed as brake unit.

It is the principal object of the present invention to simplify a radial alignment of the stator element relative to the camshaft.

SUMMARY OF THE INVENTION

In a camshaft unit, particularly of an internal combustion engine, comprising a camshaft connected to a drive unit to be driven thereby, a phase displacement unit including an actuating gear and a control unit with a rotor and a stator unit in the form of a brake element for adjusting a phase relation between the drive unit and the camshaft, and a bearing device for supporting part of the control unit, the bearing device is designed to accommodate radial tolerances between the stator element and the rotor element.

The bearing device is provided to compensate for radial tolerances between the stator element and the rotor element. A "stator element" is thereby in particular meant to be an element of the control unit that is arranged in a torque-proof manner. A "rotor element" is in particular meant to be an element corresponding with the stator element. Furthermore, a "radial tolerance" is meant to be in this connection in particular an offset by which a position of the rotor element deviates from an ideal standard position relative to the stator element. "Provided" is in particular meant to be especially equipped, designed and/or programmed.

If the bearing device is provided to compensate for the radial tolerances, an elaborate alignment of the stator element relative to the camshaft or relative to the actuating gear by means of an additional compensation device can be foregone. The radial alignment is simplified thereby and costs and installation space can be saved.

It is further suggested that the stator element and the rotor element are arranged in a bearing-free manner with regard to each other. "Bearing-free" is meant to be in this connection in particular that there is no direct bearing of the rotor element at the stator element. By means of such an arrangement, a life expectancy of the phase displacement unit can be increased, as a bearing arranged between the stator element and the rotor element, which would be strained by the tolerances, is omitted.

It is further suggested that the bearing device is provided to support at least one part of the control unit against the camshaft. An advantageous support of the rotor element can be achieved thereby in a simple manner.

It is in particular advantageous if the bearing device is provided to support the rotor element with respect to the camshaft. The radial tolerances can thereby be compensated for by means of the rotor element in a simple manner.

In a further advantageous development of the invention, the bearing device has a bearing element which is provided to support a part of the control unit and a part of the actuating gear. A particularly simple and compact support structure can be achieved thereby. A "bearing element" is thereby in particular meant to be an element which is provided to transfer support forces. The bearing element is preferably supported by the camshaft. In particular, a support of the bearing element with respect to the stator element is not needed.

Preferably, the bearing device has a bearing unit which supports the bearing elements coaxially with the camshaft. An advantageous bearing can be achieved thereby in a simple manner which permits an arrangement according to the invention. The bearing unit is preferably arranged as a fixed bearing.

In a particular embodiment of the invention the rotor element and the bearing element are connected to each other in an axially displaceable and torque-proof manner. A simple actuating unit can thereby be formed for the control unit.

It is suggested in particular that the control unit has an actuating unit with at least one electromagnetic actuator, which is provided to axially displace the rotor element. An actuating unit can be provided thereby, which can simply be controlled by means of an actuation unit.

Furthermore, the control unit is a brake unit and the rotor element brake element. A "brake element" is meant to be an element mounted in a rotary manner, whose speed can be braked by means of the stator element.

It is further suggested that the stator element has a friction lining with a friction surface radially enlarged with regard to the brake element. The tolerances can thereby be compensated for in a particular simple manner by means of the friction lining of the stator element and a friction lining of the brake element. "Radially enlarged" is meant to be in particular in this connection that the friction lining of the stator element has a friction surface which is sufficiently large in order to arrange the friction lining of the brake element with a radial offset, which compensates for the tolerances, to the friction lining of the stator element.

Preferably, the actuating gear is formed as a superposition gear. A phase displacement unit can thereby be realized in a simple manner. A "superposition gear" is thereby in particular meant to be a gear wheel transmission with a drive element, an output element and an adjusting element, wherein a transmission ratio can be adjusted between the drive element and the output element by means of a speed of the adjusting element. Planetary gears are for example suitable as superposition gears, as in particular spur wheel planetary gears. It is in particular advantageous thereby if the adjusting element is connected to the bearing element in a torque-proof manner.

It is further suggested that the brake unit has a spring unit which is provided to open the brake unit. A controllable actuator for opening the brake unit can thereby be foregone, whereby costs can be saved. The spring unit is further provided to move the brake element.

It is further suggested that the spring unit has a support element which is decoupled from the stator element. A connection between the brake element and the stator element can be avoided thereby. It is suggested in particular that the support element is connected to the bearing element, whereby the stator element can be decoupled from the spring unit in a particularly simple manner. The spring element is preferably formed as a compression spring.

The invention and further advantages thereof will become more readily apparent from the following description thereof on the basis of the accompanying drawings.

BRIEF DESCRIPTION OF THE DRAWINGS

The sole FIGURE shows a camshaft unit of an internal combustion engine.

DESCRIPTION OF A PARTICULAR EMBODIMENT

As shown in the FIGURE, the camshaft unit includes a drive unit 10 which is operatively connected to a crankshaft to be driven thereby, not shown in detail. The camshaft 11 is driven by means of the drive unit 10 and is provided to open and close charge-cycle valves, not shown in detail, of the internal combustion engine.

In order to be able to adjust an opening time of the charge-cycle valves, the camshaft unit has a phase displacement unit 12, by means of which a phase relation between the drive unit 10 and the camshaft 11 can be adjusted.

The phase displacement unit 12 has an actuating gear 13 which is formed as a superposition gear. The actuating gear 13 is formed as a three-shaft minus summation gear. The actuating gear 13 has a drive element 25, an adjusting element 26 and an output element 27. The drive element 25 is connected to the drive unit 10 and is driven by means of the crankshaft. The output element 27 is connected to the camshaft 11 in a torque-proof manner.

The actuating gear 13 is in the form of as a planetary transmission. A planetary wheel carrier 28 forms the drive element 25. Two planetary wheels 29, 30 are arranged on the planetary wheel carrier 28, which wheels are guided on a circular path by means of the planetary wheel carrier 28. The planetary wheels 29, 30 cog with a sun wheel 31 on a radially inner side, which sun wheel forms the adjusting element 26. The planetary wheels 29, 30 cog with a hollow wheel 32 at opposite sides, which hollow wheel is connected to the camshaft 11 in a torque-proof manner and forms the output shaft 27.

By means of the adjusting element 26, the phase relation between the drive unit 10 or the drive element 25 and the output element 27 can be adjusted. If the adjusting element 26 has a speed which is the same as a speed of the drive element 25, the actuating gear 13 runs as a blocked gear and the phase relation between the drive unit 10 or the drive element 25 and the output element 27 remains constant.

If the adjusting element 26 has a speed that is smaller than a speed of the drive element 25, a speed is adjusted for the output element 27 which is larger than the speed of the drive element 25. The phase relation is adjusted toward early.

If the adjusting element 26 has a speed that is larger than a speed of the drive element 25, a speed is adjusted for the output element 27 which is smaller than the speed of the drive element 25. The phase relation is adjusted toward late.

In order to be able to adjust the phase relation, the phase displacement unit 12 has a control unit 14, by means of which the speed of the adjusting element 26 can be adjusted. The control unit 14 has a rotor element 16 which is connected to the adjusting element 26 of the actuating unit 13 in a torque-proof manner. The control unit 14 further has a stator element 15 which is arranged in a torque-proof manner. The stator element 15 and the rotor element 16 are arranged corresponding to each other. The stator element 15 is connected to a housing of the phase displacement unit 12, not shown in detail, in a torque-proof manner.

In the present embodiment, the control unit 14 is designed as a brake unit and the rotor element 16 as a brake element.

In order to keep the phase relation constant, a neutral position of the brake unit 14 is adjusted by means of an actuating unit, not shown in detail. In the neutral position, a brake force acts between the stator element 15 and the brake element 16, where the speed of the drive element 25 and the speed of the output element 27 are the same.

In order to adjust the phase relation toward early, the brake unit 14 is closed further starting from the neutral position and the brake force is increased. The speed of the adjusting element 26 is reduced thereby, whereby the speed of the output element 27 becomes larger than the speed of the drive element 25 and the phase relation is adjusted toward early.

In order to adjust the phase relation to late, the brake unit 14 is opened further starting from the neutral position and the brake force is reduced. Due to drag torques of the camshaft 11, the speed of the adjusting element 26 is increased thereby and the speed of the output element 27 is decreased. The speed of the output element 27 is thereby smaller than the speed of the drive element 25 and the phase relation is adjusted toward late.

The brake unit 14 is actuated by means of an actuating unit 20 which has an electromagnetic actuator 21. The electromagnetic actuator 21 is brought into the stator element 15 of the brake unit 14. The electromagnetic actuator 21 has an electromagnet 33. If the electromagnet 33 is supplied with current, it exerts a force on the brake element 16, which attracts the brake element 16. The brake unit 14 further has a spring unit 23 which exerts a force on the brake element 16 which is opposed to the force of the electromagnetic actuator 21.

The brake element 16 is arranged in an axially displaceable manner. A compression force and thus the brake force are adjusted via a current supply of the electromagnet 33. The compression force is thereby formed as a difference between the force of the electromagnet 33 and the spring unit 23.

For support of a part of the brake unit 14 and a part of the actuating gear 13, the camshaft unit has a bearing device 17, by means of which the brake element 16 of the brake unit 14 and the adjusting element 26 of the actuating gear 13 are supported. The bearing device 17 has a support shaft element 18, on which the brake element 16 is arranged in a torque-proof and axially displaceable manner. The adjusting element 26 is connected to the bearing element 18 in a torque-proof and axially fixed manner.

The bearing element 18 is supported at the camshaft 11 by means of a bearing unit 19 of the bearing device 17. The camshaft 11 is designed as a hollow shaft for this. The bearing element 18 passes through a part of the camshaft 11. The bearing unit 19 is designed as a fixed bearing which is provided to receive axial forces. The bearing element 18 and the camshaft 11 are supported coaxially to each other by means of the bearing unit 19. In this way, the brake element 16 and the adjusting element 26 are arranged coaxially to the camshaft 11.

The bearing element 18 has a support element 24 on a side facing the stator element 15. The support element 24 is formed integrally with the bearing element. The spring unit 23 has a spring element 35 is supported on the support element 24 with a first end and on the brake element 16 at a second end. The spring element is in the form of a compressor spring.

On the side facing the stator element 15, the bearing element 18 is arranged in a recess 34 in the stator element in a contact-free manner. In the radial direction, the bearing element is designed spaced to the stator element 15. As there is no bearing structure between the stator element 15 and the brake element 16, the brake element 16 and the stator element 15 can be displaced radially against each other. A maximum radial displacement is thereby delimited by the size of the recess 34, in which the bearing element is arranged. The maximum displacement from a central arrangement of the bearing element 18 in the recess 34 is 0.5 mm.

By means of tolerances in a manufacture of the camshaft unit, the stator element 15 and the camshaft 11 or the brake element 16 have a radial tolerance with which they are aligned to each other. The radial tolerance which leads to an offset between the brake element 16 and the stator element 15 is provided for by the bearing shaft element (18) being supported only by the bearing device 17 mounted on the camshaft 11.

The bearing device 17 which arranges the brake element 16 and the stator element 15 in a bearing-free manner to each other permits an arrangement of the stator element 15 to the brake element within the radial tolerances due to the possible radial displacement between the brake element 16 and the stator element 15. A friction lining 22 of the stator element 15 has therefore a friction surface, which is designed in a radially enlarged manner with regard to the brake element 16 or a friction surface of a friction lining 36 of the brake element 16. It is ensured thereby that the friction lining 36 of the brake element 16 is always arranged in a completely overlapping manner with the friction lining 22.

What is claimed is:

1. A camshaft adjusting unit, in particular of an internal combustion engine, comprising a camshaft (11) connected to a drive unit (10) to be driven thereby, a phase displacement unit (12) including an actuating. gear structure (13) and a control unit (14) with a stator element (15) and a rotor element (16) for adjusting a phase relation between the drive unit (10) and the camshaft (11), and a bearing device (17) for supporting the rotor element (16) of the control unit (14) on the camshaft (11), the stator element (15) and the rotor element (16) being arranged relative to each other in a bearing-free manner so as to tolerate radial displacement between the stator element (15) and the rotor element (16).

2. The camshaft adjusting unit according to claim 1, wherein the bearing device (17) is provided to support at least a part of the control unit (14) with respect to the camshaft (11).

3. The camshaft adjusting unit according to claim 1, wherein the rotor element (16) is supported by the bearing device (17) with respect to the camshaft (11).

4. The camshaft adjusting unit according to claim 1, wherein the bearing device (17) has a bearing element (18) which is provided to support a part of the control unit (14) and a part of the actuating gear structure (13).

5. The camshaft adjusting unit according to claim 4, wherein the bearing device (17) has a bearing unit (19) supporting the bearing element (18) coaxially with the camshaft (11).

6. The camshaft adjusting unit according to claim 4, wherein the rotor element (16) and the bearing element (18) are connected to each other in an axially displaceable and torque-proof manner.

7. The camshaft adjusting unit according to claim 1, wherein the control unit (14) has an actuating unit (20) with at least one electromagnetic actuator (21), which is provided to axially displace the rotor element (16).

8. The camshaft adjusting unit according to claim 1, wherein the control unit comprises a brake unit (14) and the rotor element comprises a brake element (16) arranged opposite the brake unit (14) in a plane extending normal to the axis thereof.

9. The camshaft adjusting unit according to claim 8, wherein the stator element (15) has a friction lining (22) with a radially increased friction surface with regard to the brake element (16).

10. The camshaft adjusting unit according to claim 1, wherein the actuating gear (13) is a superposition gear.

11. The camshaft adjusting unit according to claim 1, wherein the brake unit (14) has a spring unit (23) which is provided so as to hold the brake unit (14) open.

12. The camshaft adjusting unit according to claim 11, wherein the spring unit (23) has a support element (24) that is decoupled from the stator element (15).

* * * * *